United States Patent [19]

Takahashi

[11] Patent Number: 4,771,383

[45] Date of Patent: Sep. 13, 1988

[54] SALES DATA PROCESSING APPARATUS

[75] Inventor: Hiroshi Takahashi, Tokyo, Japan

[73] Assignee: Casio Computer Co., Ltd., Tokyo, Japan

[21] Appl. No.: 752,457

[22] Filed: Jul. 5, 1985

[30] Foreign Application Priority Data

Jul. 31, 1984 [JP] Japan ............................ 59-158592
Jul. 31, 1984 [JP] Japan ............................ 59-158593

[51] Int. Cl.⁴ .......................................... G06F 15/00
[52] U.S. Cl. ................................................ 364/405
[58] Field of Search ............. 364/200, 900, 403, 404, 364/405; 235/385

[56] References Cited

U.S. PATENT DOCUMENTS

| 3,637,989 | 1/1972 | Howard et al. | 235/385 |
| 4,186,439 | 1/1980 | Shimura et al. | 364/405 |
| 4,245,311 | 1/1981 | Nakamura | 364/405 |
| 4,424,567 | 1/1984 | Yasutake | 364/405 |
| 4,493,037 | 1/1985 | Takano et al. | 364/405 |
| 4,502,119 | 2/1985 | Tsuzuki | 364/405 |

FOREIGN PATENT DOCUMENTS 56-110175 9/1981 Japan .
58-039367 3/1983 Japan .

OTHER PUBLICATIONS

LBF, "Lagerbestandsfuhrung und Fakturierung fur Fertigwaren-bestande", (Inventory Control and Invoicing for Finished Goods) data praxis. Siemens AG, 1972.
Steuerungstechnik 5 (1972), No. 9/10, pp. 228 to 230.

Primary Examiner—Gareth D. Shaw
Assistant Examiner—John G. Mills
Attorney, Agent, or Firm—Frishauf, Holtz, Goodman & Woodward

[57] ABSTRACT

A sales data processing apparatus has a stock data memory for storing stock data indicating the stock of each item. When sales of a certain item are registered, a value corresponding to a registered number is subtracted from the stock data corresponding to the item. When the item is put into stock, the stock-in number is added to the stock data. The apparatus has a detector for detecting that the stock data has reached a predetermined value. When the detector detects that the stock data has reached the predetermined value, date and time data at this time are stored in an out-of-stock date and time memories, respectively. By switching a mode switch, the out-of-stock date and time data are subtracted from current time data, thereby calculating out-of-stock period data indicating the period the item has been in the out-of-stock state.

12 Claims, 10 Drawing Sheets

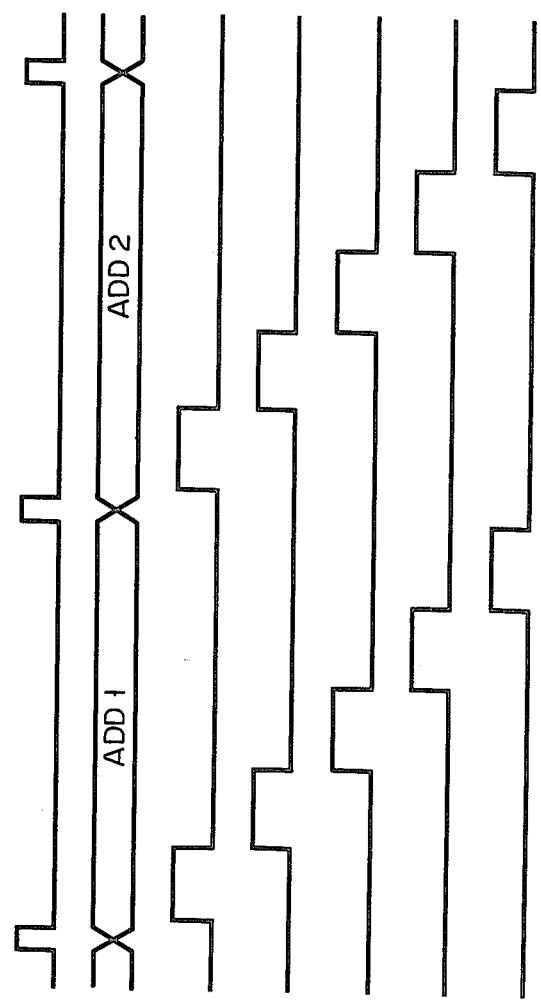

| PLU NO. | ITEM NAME | STOCK | SALES NUMBER | UNIT PRICE | OUT-OF-STOCK DAYS HOURS | OUT-OF-STOCK LIMIT MARK |
|---|---|---|---|---|---|---|
| | | 84 - 06 - 05 | | | | |
| 01 | SANDWICH | 0 | 0 | 300¥ | 3 DAYS | * |
| 02 | JUICE | 20 | 10 | 100¥ | | |
| 03 | COFFEE | 15 | 5 | 100¥ | | |

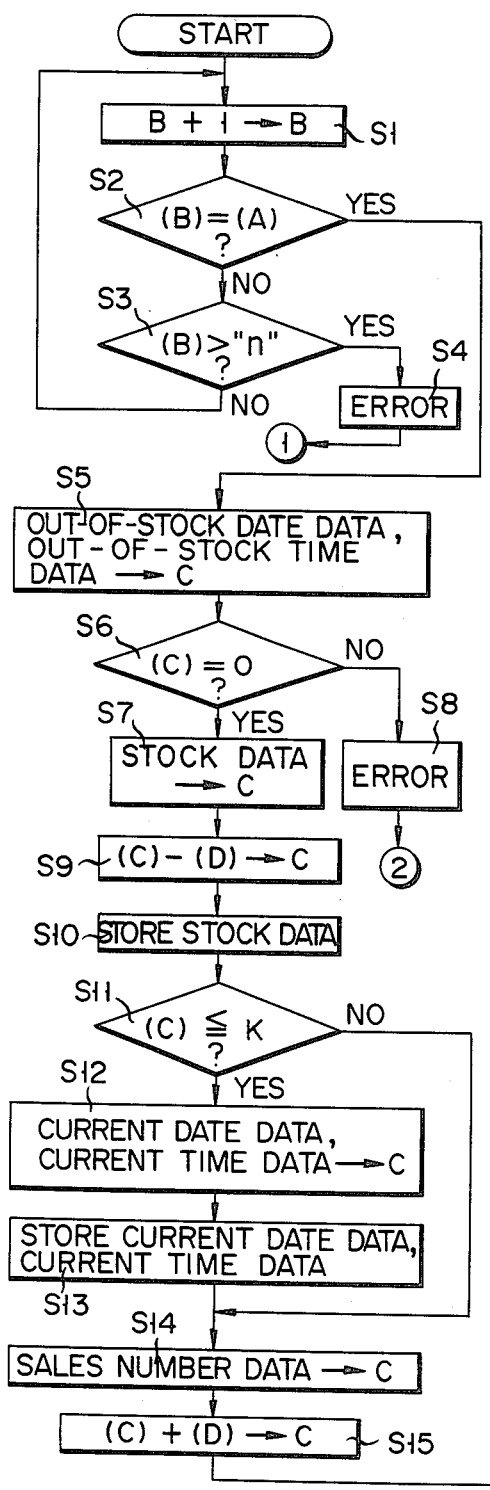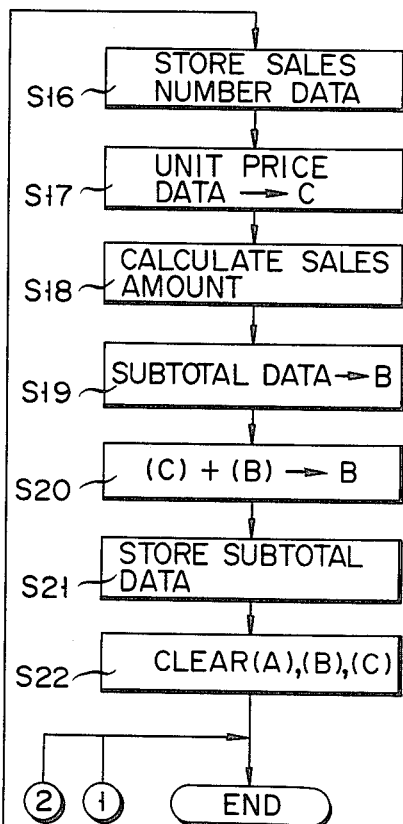
FIG. 7

SALES DATA PROCESSING APPARATUS

BACKGROUND OF THE INVENTION

The present invention relates to a sales data processing apparatus and, more particularly, to an improvement in a sales data processing apparatus which can perform inventory control.

Conventionally, a sales data processing apparatus which can check the stock level of a certain item on hand or in a warehouse (i.e., can perform inventory control) is known. Such a sales data processing apparatus is described in Japanese Patent Disclosure No. 56-110175. This apparatus comprises a memory for storing the stock level of every type of item or of every section of items. Every time a certain item is registered, i.e., sold, the number of items registered is subtracted from the stock stored in the memory. Thus, the current stock can be calculated and then, the stock level printed in a summary report.

However, in the conventional inventory control method, satisfactory inventory control cannot be performed. For example, assume that a certain item is in an out-of-stock state (i.e., the stock thereof is zero) when the stock of the item is printed on a summary report. In this case, a retainer cannot know how long (or how many days) the out-of-stock state has continued. For this reason, he cannot judge to what extent sales are influenced by the out-of-stock state of the item.

SUMMARY OF THE INVENTION

It is an object of the present invention to provide a sales data processing apparatus which can provide data on a period (number of days and hours) of an out-of-stock state of a certain item and can thus perform more satisfactory inventory control.

According to the present invention, there is provided a sales data processing apparatus comprising:

stock data storing means (M21) for storing stock data indicating the stock of each item;

means (21) for subtracting a value corresponding to a registered number from stock data corresponding to at least one item which is registered in a sales data registration mode;

detecting means (25) for detecting when the stock data reaches a predetermined value;

current time data storing means (413, 415) for storing current time data;

calculation control means (65) for requesting the calculation of period data indicating the period of time elapsed after the stock data reached the predetermined value in accordance with a calculation instruction;

means for calculating the period data in accordance with a detection result from said detecting means and the current time data; and period data storing means (M8, M9) for storing the period data.

When the sales data processing apparatus with the above arrangement according to the present invention is used, a period (number of days and hours) in which a certain item is in the out-of-stock state can be precisely determined. For this reason, influence of out-of-stock items on sales can also be determined. Therefore, more precise and effective inventory control can be performed.

BRIEF DESCRIPTION OF THE DRAWINGS

FIGS. 2A to 2G are timing charts showing the relationship between signals of respective portions of the circuit shown in FIGS. 1A and 1B;

FIG. 7 is a flow chart for explaining an operation in a registration mode of the sales data processing apparatus according to the third and fourth embodiments of the present invention;

DETAILED DESCRIPTION OF THE PREFERRED EMBODIMENTS

Figure 1A:
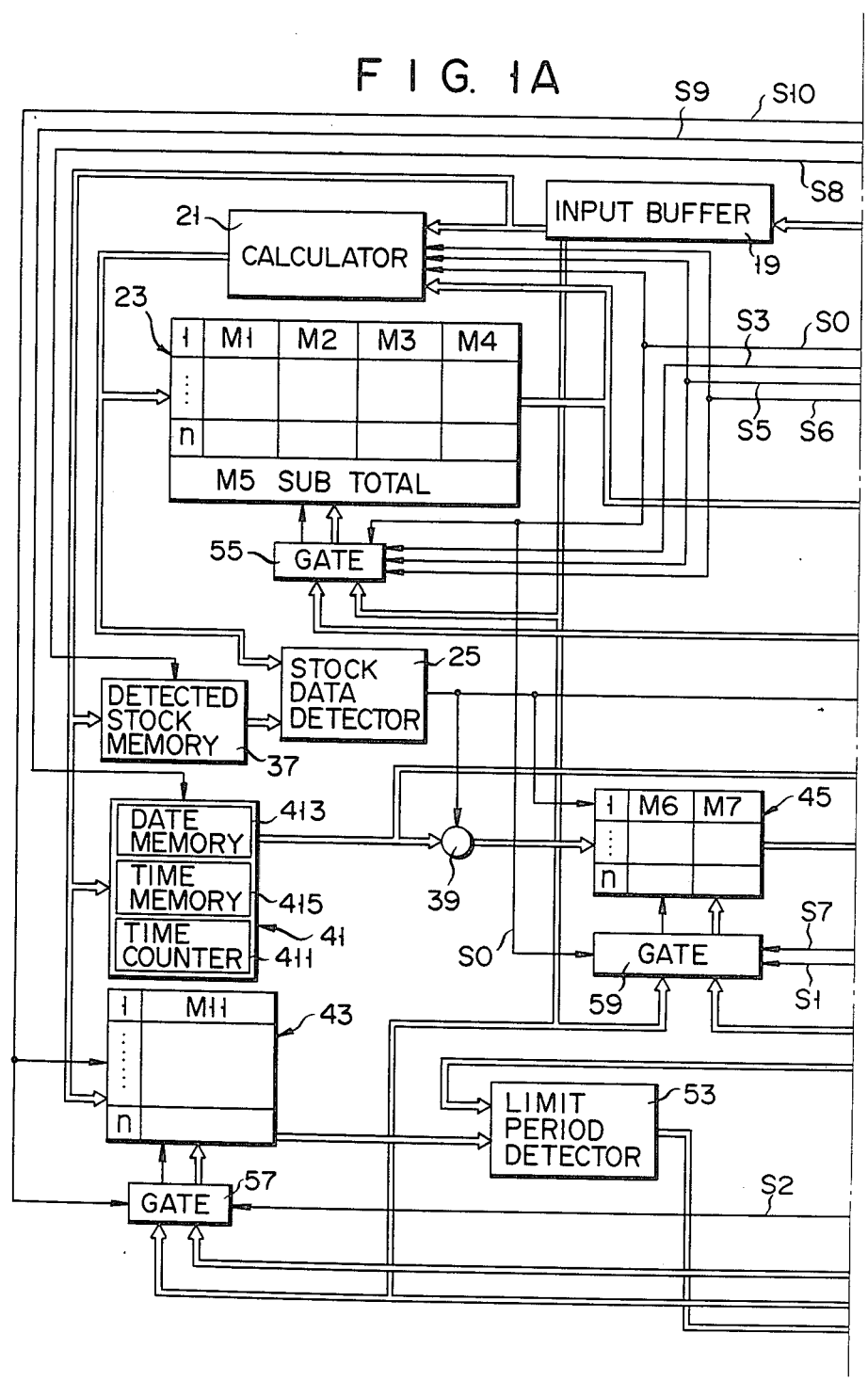
FIGS. 1A and 1B are circuit diagrams showing an arrangement of a sales data processing apparatus according to a first embodiment of the present invention.

A sales data processing apparatus according to a first embodiment of the present invention will be described with reference to the accompanying drawings.

First, an arrangement of the sales data processing apparatus according to the first embodiment of the present invention will be described with reference to FIGS. 1A and 1B. It should be noted that for the sake of simplicity, only items 1 to n are numbered.

A keyboard 1 includes a clear key 3, a time key 5, numeric keys 7, section (department) keys 9, a PLU (price look-up) key 11, a subtotal key 13, a cash/deposit key 15, a mode switch 17 and the like. The PLU key 11 is used to look up a preset unit price of a frequently registered item. The mode switch 17 is used to turn a power source on or off, and to switch registration, check, summary, setting, stock-in and return modes.

Output data from the keyboard 1, e.g., PLU code data, sales number data and the like is supplied to an input buffer 19. The input buffer 19 temporarily stores the input data. The buffer 19 supplies as address data the PLU code data among the input data to a gate 55 to be described later. On the other hand, the buffer 19 supplies the sales data indicating the sales number among the input data to a calculator 21. The output data from the calculator 21 is supplied to a stock memory 23 and a stock data detector 25. The memory 23 comprises the following memory areas: a memory area M1 for storing a character code of each type of item, a memory area M2 for storing the stock level of each type of item, a memory area M3 for storing the sales number of each type of item, a memory area M4 for storing the unit price of each item, and a memory area M5 for storing the subtotal of sales of each type of item. Locations of the respective memory areas M1 to M4 are assigned addresses from 1 to n in correspondence with the items of item numbers 1 to n. The output data from the memory 23 is supplied to the calculator 21. On the other hand, the output data from the memory 23 is also supplied to one input terminal of a gate 27. The output data from the gate 27 is supplied to an output buffer 29. The output data from the buffer 29 is supplied to a printer 31, a display 33 and a transmission controller 35 for data communication with an external device (e.g., a host computer).

The output data from the input buffer 19 is also supplied to a detected stock memory 37. The output data from the memory 37 is supplied to the detector 25. The output signal from the detector 25 is supplied to a gate 39 as a control signal for turning it on/off.

The output data from the input buffer 19 is also supplied to a timer unit 41 and a limit memory 43. The timer unit 41 comprises a time counter 411, a date memory 413 for storing current date data in accordance with the output data from the counter 411, and a time memory 415 for storing current time data. The output data from the timer unit 41 is supplied to the gate 39 and an out-of-stock period calculator 47. The output data from the gate 39 is supplied to an out-of-stock time memory 45. The memory 45 has a memory area M6 for storing the date when a corresponding item is in the out-of-stock state and a memory area M7 for storing the corresponding time. The areas M6 and M7 have addresses from 1 to n in the same manner as in the area M1 and the like. The output data from the memory 45 is supplied to the calculator 47. The calculator 47 calculates the input data difference, and supplies data corresponding to the difference to one input terminal of a gate 49. The output data of the gate 49 is supplied to an out-of-stock period memory 51. The memory 51 comprises a memory area M8 for storing the number of days, a memory area M9 for storing the number of hours, and a memory area M10 which is flagged when the out-of-stock state period exceeds a predetermined period. The areas M8, M9 and M10 also have addresses from 1 to n.

The limit memory 43 comprises a memory area M11 for storing limit data indicating the limit of the out-of-stock period of the corresponding item. The area M11 has addresses from 1 to n in the same manner as in the area M1 and the like. The output data from the memory 43 is supplied to one input terminal of a limit period detector 53. The output data from the memory 51 is supplied to the other input terminal of the detector 53. The output data from the detector 53 is supplied to the other input terminal of the gate 49. The output data from the memory 51 is supplied to the other input terminal of the gate 27.

Gates 55, 57, 59 and 61 are provided for the memories 23, 43, 45 and 51 for designating addresses thereof. These gates receive address data from an address generator 63 (to be described later) and various control signals from a controller 65 (also to be described later). Each gate selects one of two input data in accordance with control signals (to be described later) and generates the selected data. Also, each gate supplies an enable signal to the corresponding memory in accordance with these input data and input signals. The address data from the input buffer 19 is supplied to one input terminal of each gate. The address data generated from the address generator 63 is supplied to the other input terminal of each gate. The address generator 63 is a counter, and increments its count by one in response to a count-up signal (to be described later). The generator 63 generates data corresponding to the count as address data.

Mode data MD (indicating registration, summary, stock-in and setting modes) generated from the keyboard 1 and other key-input data KD are supplied to the input/output controller 65. The controller 65 decodes the input data, and supplies various control signals to respective portions at a predetermined timing. The controller 65 supplies a 0th control signal S0 to the calculator 21 and the gates 27, 55 and 59. The controller 65 supplies first and second control signals S1 and S2 to the gates 49, 59, and 61. The controller 65 supplies a third control signal S3 to the gates 27 and 55. The controller 65 supplies a fourth control signal S4 to the gates 27 and 61. The controller 65 supplies fifth and sixth control signals S5 and S6 to the calculator 21 and the gate 55. The controller 65 supplies a seventh control signal S7 to the gates 49, 59 and 61. The controller 65 supplies an eighth control signal S8 to the memory 37. The controller 65 supplies a ninth control signal S9 to the timer unit 41. The controller 65 supplies a 10th control signal to the memory 43 and the gate 57. Furthermore, the controller 65 supplies a count-up signal CU to the address generator 63.

The operation of the sales data processing apparatus with the above arrangement will be described hereinafter. The sales data processing apparatus has the registration mode, the summary mode, the stock-in mode, the set mode and the like as operation modes. In the registration mode, sales registration of items purchased by a customer is performed. In the summary mode, for example, a sales amount per day, and an out-of-stock state to be described later are outputted. In the stock-in mode, when the items are put into stock, the stock data stored in the apparatus is updated. In the setting mode, storage data are set in the memories 23, 43 and the like.

The operation of the apparatus in the registration mode will be first described. For the sake of simplicity, p items of an item number (PLU code) m are registered.

When sales are registered, an operator switches the mode switch 17 to the registration mode R. Thus, mode data MD corresponding to the registration mode is supplied to the controller 65. The operator inputs the PLU code data m and the sales number p by the keys 7, 11 and the like. The sales number data and the PLU code data are supplied to the input buffer 19, and are temporarily stored therein. The PLU code data m among the data stored in the buffer 19 is supplied to the gates 55, 57, 59 and 61 as the address data.

On the other hand, the controller 65 causes the 0th control signal S0 to go to the H level in response to the mode data MD. Thus, the gate 55 selects the address data from the buffer 19 from two input data and generates it. That is, an address m on the memory 23 is designated. The operation of the calculator 21 is designated by the signal S0. The calculator 21 sequentially reads out data at locations of the memory areas M1 to M4 defined by the address m. At first, the calculator 21 reads out the stock data stored at the address m of the area M1. However, in this case, particular processing is not performed. Then, the calculator 21 reads out the stock data stored at the address m in the memory area M2. The calculator 21 subtracts from the stock data the sales number p supplied from the buffer 19, thus updating the stock data. The updated stock data is stored in the memory area M2 of the memory 23. Furthermore, the updated stock data is supplied to the stock data detector 25. The detector 25 compares data stored in the detected stock memory 37 (e.g., "0") with the updated stock data. When the detector 25 detects that the updated stock data is equal to or smaller than the storage data in the memory 37, it determines that the item is in the out-of-stock state and generates an H level signal. In response to this signal, the gate 39 is enabled. The storage data in the date memory 413 and the time memory 415 of the timer unit 41 are supplied to the out-of-stock time memory 45 through the gate 39. In this case, the address data m from the buffer 19 is continuously supplied to the gate 59. Since the 0th control signal S0 is at the H level, the gate 59 selects the output data from the buffer 19 and generates it. For this reason, the memory 45 stores the date data from the timer unit 41 at the address "m" in the memory area M6, and stores the time data at the address "m" in the memory area M7. On the other hand, when the updated stock data is larger than the storage data in the memory 37, the detector 25 generates an L level signal. In response to this, the gate 39 is disabled. For this reason, data "0" is stored in the memory areas M7 and M8.

Then, the calculator 21 reads out the content (sales number) at the address m in the memory area M3. The calculator adds the content of the memory area M3 to the sales number supplied from the buffer 19. In this manner, a new sales number is calculated. The new sales number is stored in the memory area M3 again.

The calculator 21 reads out a unit price stored at the address m in the memory area M4. The calculator 21 multiplies the sales number supplied from the buffer 19 with the unit price so as to obtain the sales amount. The calculator 21 reads out the subtotal data stored in the memory area M5, and adds the calculated sales amount to the subtotal data, thereby obtaining new subtotal data. The new subtotal data is stored in the memory area M5 of the memory 23.

During the above operation, the output data from the memory 23 is supplied to the gate 27. The gate 27 selects the data from the memory 23 in response to the signal S0 and generates it. The output data from the gate 27 is supplied to the printer 31, the display 33 and the controller 35 through the output buffer 29. Thus, the item number, the sales number, the unit price and the sales are printed on journal paper, thus completing one registration operation.

Every time each item is registered, the stock, sales number, and the like are calculated and are printed as needed.

The operation in the summary mode of the sales data processing apparatus will be described hereinafter. In the summary mode, storage data per day of the apparatus is outputted.

The operator switches the mode switch 17 to the summary mode Z. The controller 65 detects that the mode data MD corresponding to the summary mode is supplied. The controller 65 supplies the signals CU and S1 to S5 at timings indicated by FIGS. 2A, 2C to 2G. Thus, output addresses of the address generator 63 are changed as shown in FIG. 2B.

The controller 65 supplies the count-up signal CU to the address generator 63. In response to this, the address generator generates address data "1".

The controller 65 changes the first control signal S1 to the H level. In response to the signal S1, the gate 59 supplies the output address data "1" from the address generator 63 to the out-of-stock time memory 45. The out-of-stock period calculator 47 reads out storage contents in locations defined by the address "1" on the memory areas M6 and M7. The calculator 47 reads out the current date and time data from the date memory 413 and the time memory 415 of the timer unit 41. When the contents of the memory areas M6 and M7 are not "0", the calculator 47 subtracts the data read out from the memory 45 from the current date and time data. Thus, the out-of-stock period of the item specified by the output address data "1" from the generator 63 can be obtained in units of days and hours. When the contents of the memory areas M6 and M7 are "0", the above calculation is not performed. The calculation results are supplied to the gate 49. The gate 49 is responsive to the signal S1 for supplying the calculation results to the memory 51. On the other hand, the gate 61 supplies the output address data "1" from the generator 63 to the memory 51 in accordance with the signal S1. Thus, the number-of-day data of the calculation results is stored in the location defined by the address "1" of the memory area M8. Similarly, the hour data is stored at the address "1" in the memory area M9.

The controller 65 changes the signal S1 to the L level, and the second control signal S2 to the H level. The gates 57 and 61 select the address "1" and generate it. The detector 53 reads out the storage contents in the location designated by the address "1" in the memory 51. On the other hand, the detector 53 also reads out the storage contents designated by the address "1" in the memory 43. The detector 53 compares the two input data. When the detector 53 detects that the data stored at the address "1" in the memory areas M8 and M9 (out-of-stock period data of the item of the item number "1") is equal to or larger than the data stored at the address "1" on the memory area M11 of the memory 43, it sets a flag in the memory area M10. In other words, when the out-of-stock state of the item of the item number "1" is equal to or larger than a limit period, the flag is set.

Figures 3, 5:
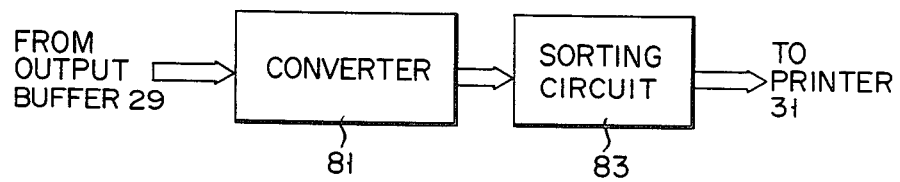
FIG. 3 is a view showing an example of journal paper printed in a summary mode of the sales data processing apparatus according to the first embodiment of the present invention.
FIG. 5 is a block diagram for explaining a modification of the sales data processing apparatus according to the first and second embodiments.

Next, the printing operation is performed. The controller 65 sets the signal S2 to the L level and the signal S3 to the H level. The gate 55 selects the address data "1" and generates it. Thus, the memory 23 sequentially generates the storage contents in the locations defined by the address "1" on the memory areas M1 to M4. The gate 27 selects the output data from the memory 23 in accordance with the signal S3 and generates them. The selected data are sequentially fetched by the output buffer 29. The data is supplied to the printer 31, the display 33 and the controller 35. In response to this, the date data is first printed. Then, an item number "01" and an item name (a sandwich herein) are printed. When the sales data is present, the sales number, the unit price and the sales amount are printed. Then, the controller 65 sets the signal S3 to the L level and the fourth control signal S4 to the H level. In response to this, the storage data in the locations defined by the address "1" in the memory areas M8 to M10 are supplied to the gate 27. The gate 27 selects the data from the memory 51 in accordance with the signal S4, and supplies it to the output buffer 29. The printer 31 prints the number of out-of-stock days and the out-of-stock hours on the journal paper. Furthermore, when the out-of-stock flag is set, the printer 31 prints "*" as a signal. In this manner, as shown in FIG. 3, the journal paper for the item of the item number "01" is printed.

The controller 65 sets the signal S4 to the L level and the fifth control signal S5 to the H level. The calculator 21 clears the sales number stored at the address "1" in the memory area M3. In this case, data "0" is written at the address "1" in the memory area M3.

After the above operation, i.e., after the operation for the address "1", the controller 65 supplies the count-up signal CU to the address generator 63. Thus, the address generator 63 generates address data "2". Thereafter, the first to fifth control signals S1 to S5 sequentially go to the H level, and the above summary operation is executed. The above operation is repeated up to the address "n", thereby outputting the journal paper shown in FIG. 3.

The operation in the stock-in mode of the sales data processing apparatus will be described hereinafter.

The operator switches the mode switch 17 to the stock-in mode. Then, the operator inputs the item code and the number of stock-in items by the numeric keys 7 and the PLU key 11. Assuming that "r" items of a PLU code "q" are put into stock. The input data is temporarily stored in the input buffer 19. The controller 65 sets the signal S6 to the H level. The gate 55 selects address data "q" from the buffer 19 in response to the signal S6, and generates it. The calculator 21 adds the stock data stored at the address "q" in the memory area M2 to the stock-in data "r" supplied from the buffer 19 in response to the signal S6, thereby calculating new stock data. The new stock data is written at the address "q" in the memory area M2.

The controller 65 sets the control signal S6 to the L level and the seventh control signal S7 to the H level. The addresses "q" in the memory areas M6, M7, M8, M9 and M10 of the memories 45 and 51 are designated. On the other hand, the new stock data is also supplied to the detector 25. The detector 25 compares the new stock data with the data stored in the memory 37. When the new stock data is equal to or larger than the predetermined value stored in the memory 37, the detector 25 generates the L level signal in the same manner as in the registration mode. On the other hand, when the new stock data is smaller than the data stored in the memory 37, the detector 25 generates the H level signal. In response to the L level signal, the data at the addresses "q" in the memory areas M6, M7, M8, M9 and M10 of the memories 45 and 51 are cleared (data "0" is stored therein).

The above operation is executed every time the data is inputted from the keyboard 1.

The operation in the setting mode of the sales data processing apparatus will be described hereinafter. In the setting mode, the unit price of each item, and the number of limit days are reset.

The operator switches the mode switch 17 to the setting mode. When time data is set in the timer unit 41, the keys are operated as follows:

$$\boxed{8} \rightarrow \boxed{5} \rightarrow \boxed{0} \rightarrow \boxed{4} \rightarrow \boxed{1} \rightarrow$$

$$\boxed{5} \rightarrow \boxed{1} \rightarrow \boxed{2}$$

$$\boxed{1} \rightarrow \boxed{5} \rightarrow \boxed{T}$$

In this manner, Apr. 15, 1985, 12' 15" is set. In response to the key data KD inputted upon depression of the time key 5 and the like, the controller 65 sets the ninth control signal S9 to be the H level, thereby correcting the time data in the timer unit 41.

In order to correct the number of limit days or hours, for example, when the number of out-of-stock limit days of an item of the PLU code "1" is set to be 3 days and 0 hours, the keys are operated as follows:

$$\boxed{1} \rightarrow \boxed{PLU} \rightarrow \boxed{0} \rightarrow \boxed{3} \rightarrow$$

$$\boxed{0} \rightarrow \boxed{0} \rightarrow \boxed{T}$$

The 10th control signal S10 goes to the H level in response to the operation of the PLU key 11 and the time key 5. The gate 57 thus selects the output address data from the buffer 19, and supplies the selected data to the memory 43. The signal S10 is supplied to the memory 43. The data indicating the number of days and hours are supplied from the buffer 19 to the memory 43. Therefore, data indicating 3 days is stored at the address "1" in the memory area M11.

When the out-of-stock limit of the item of the PLU code 10 is set to be 5 hours, the keys are operated as follows:

$$\boxed{1} \rightarrow \boxed{0} \rightarrow \boxed{PLU} \rightarrow \boxed{0} \rightarrow$$

$$\boxed{0} \rightarrow \boxed{0} \rightarrow \boxed{5} \rightarrow \boxed{T}$$

In order to set the data in the memory 37, the keys are operated as follows:

$$\boxed{0} \rightarrow \boxed{SUB}$$

This example represents that when the stock of the item becomes "0", it is regarded as the out-of-stock state. The eighth control signal S8 goes to the H level, and the memory 37 is switched to a write mode. Thus, the memory 37 stores the input data supplied from the buffer 19. By changing the storage data of the memory 37, a standard for the out-of-stock state of the item can be arbitrarily set.

Figure 4A:
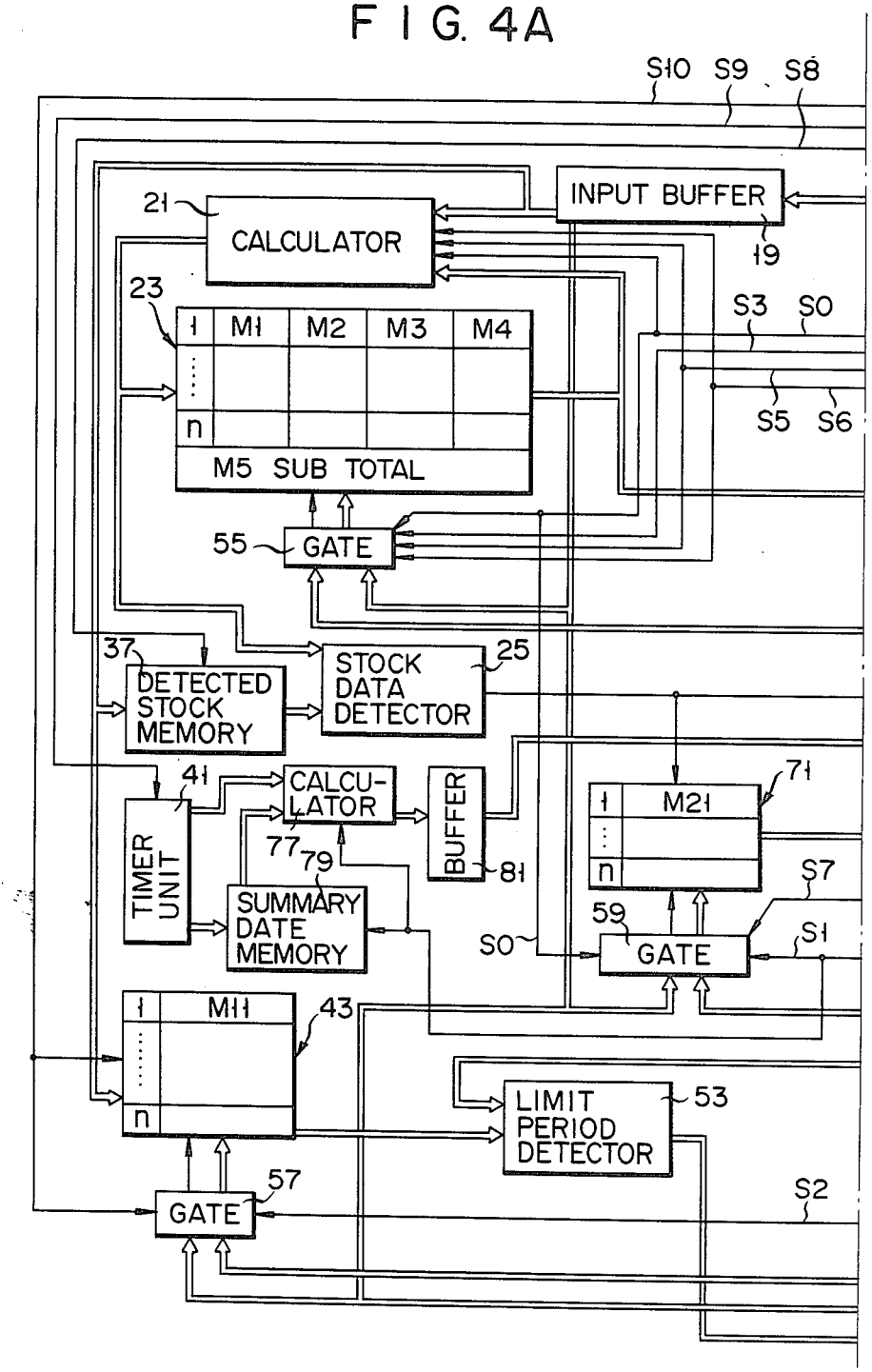
FIGS. 4A and 4B are circuit diagrams showing an arrangement of a sales data processing apparatus according to a second embodiment of the present invention.
Figure 4B:
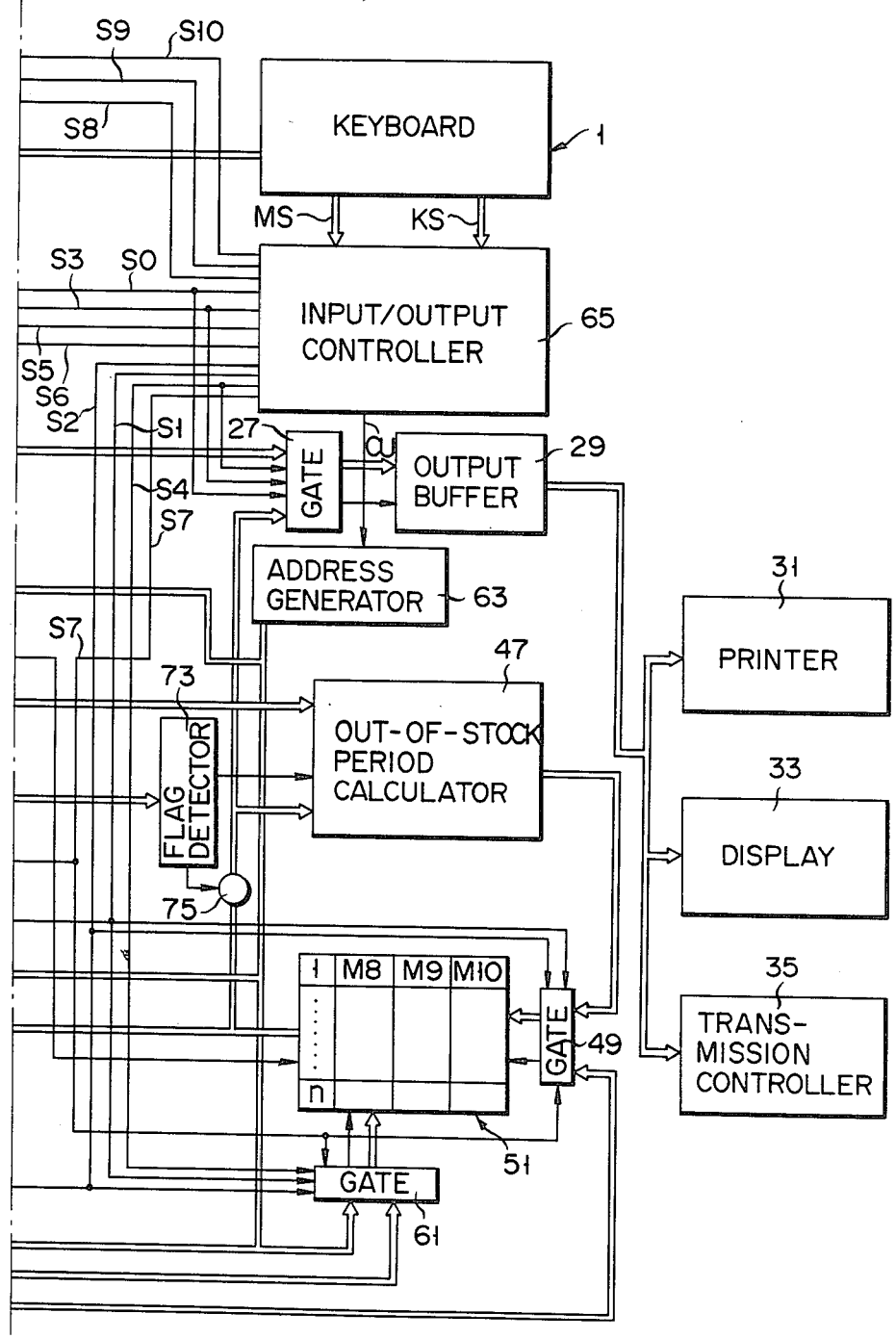

A sales data processing apparatus according to a second embodiment of the present invention will be described with reference to FIGS. 4A and 4B. The arrangement of the apparatus will be described first. The same reference numerals as in FIGS. 1A and 1B denote the same parts in FIGS. 4A and 4B, and a detailed description thereof is omitted.

Output data from a keyboard 1 is supplied to an input buffer 19. The buffer 19 supplies address data to a gate 55 in the same manner as in the first embodiment. On the other hand, the buffer 19 supplies sales number data and the like to a calculator 21. The output data is supplied to a stock memory 23 and a stock data detector 25. The output data from the memory 23 is supplied to the calculator 21 and a gate 27. The output data from the gate 27 is supplied to an output buffer 29. The output data from the buffer 29 is supplied to a printer 31, a display 33 and a transmission controller 35.

The output data from the input buffer 19 is also supplied to a detected stock memory 37. The output data from the memory 37 is supplied to the detector 25. The output signal from the detector 25 is supplied to an out-of-stock flag memory 71 and an out-of-stock period memory 51. The memory 71 has a memory area M21 in which a flag is set when a certain item is in the out-of-stock state. The memory area M21 has first to nth addresses corresponding to item numbers "1" to "n". The output data from the memory 71 is supplied to a flag detector 73. The output signal from the detector 73 is supplied to a gate 75 and an out-of-stock period calculator 47 as a control signal. The output data from a timer unit 41 is supplied to one input terminal of an elapsed days calculator 77 and a summary date memory 79. The output data from the memory 79 is supplied to the other input terminal of the calculator 77. The output data from the calculator 77 is supplied to one input terminal of the calculator 47 through a buffer 81. The output data from the calculator 47 is supplied to one input terminal of a gate 49. The output data from the gate 49 is supplied to the memory 51. The output data from the memory 51 is supplied to the other input terminal of the calculator 47 through the gate 75.

The output data from a limit memory 43 is supplied to one input terminal of a limit period detector 53. The output data from the memory 51 is supplied to the other input terminal of the detector 53. The output data from the detector 53 is supplied to the other input terminal of the gate 49.

Gates 55, 57, 59 and 61 are respectively provided for the memories 23, 43, 51 and 71. The address data from the input buffer 19 is supplied to one input terminal of each of the gates 55, 57, 59 and 61. On the other hand, address data generated from an address generator 63 is supplied to the other input terminal of each of the gates 55, 57, 59 and 61.

The data from the keyboard 1 is supplied to an input/output controller 65. The controller 65 supplies control signals to respective portions. The controller 65 supplies a control signal S0 to the calculator 21 and the gates 27, 55, 59. The controller 65 supplies a control signal S1 to the calculator 77, the memory 79 and the gates 49, 59 and 61. The controller 65 supplies a control signal S2 to the gates 49, 57 and 61. The controller 65 supplies a control signal S3 to the calculator 21 and the gates 27 and 55. The controller 65 supplies a control signal S4 to the gates 47 and 61. The controller 65 supplies control signals S5 and S6 to the calculator 21 and the gate 55. The controller 65 supplies a control signal S7 to the gates 49, 59 and 61. The controller 65 supplies a control signal S8 to the memory 37. The controller 65 supplies a control signal S9 to the timer unit 41. The controller 65 supplies a control signal S10 to the memory 43 and the gate 57. Furthermore, the controller 65 supplies a count-up signal CU to the address generator 63.

The operation of the sales data processing apparatus according to the second embodiment will be described hereinafter.

First, the operation in the registration mode will be described. In the registration mode, the same operation as in the first embodiment is performed. That is, when the PLU code and the sales number are input, the signal S0 goes to H level. The calculator 21 sequentially reads out the data at the address on the memory 23 designated by the output data from the gate 55, thereby calculating the stock, the sales number, the subtotal, etc. In this case, when the stock data is calculated by the calculator 21, the stock data is supplied to one input terminal of the detector 25. On the other hand, the storage data in the memory 37 is supplied to the other input terminal of the detector 25. When the stock data is equal to or smaller than the stock data stored in the memory 37, the detector 25 generates H level signal. At this time, the gate 59 also receives the address data from the buffer 19, and the signal S0 is at the H level. For this reason, a flag is set in a location corresponding to the input item code. For example, when "10" items of PLU code data "10" is registered, and stock of the item becomes "0", a flag is set at address "10" of the memory 71. When the stock data is larger than the value stored in the memory 37, the detector 25 generates an L level signal. Thus, no flag is set.

The above operation is performed every time sales of items are registered.

The operation in the summary mode of the sales data processing apparatus will be described.

The operator switches the mode switch to the summary mode in the same manner as in the first embodiment.

The controller 65 is responsive to the mode data MD corresponding to the summary mode for setting the count-up signal and the first to fifth control signals to the H level as shown in FIGS. 2A to 2G.

The controller 65 supplies the count-up signal CU to the address generator 63, thus causing the generator 63 to generate address data "1".

The controller 65 sets the first control signal to the H level. The memory 79 generates date data indicating a date and time of the previous summary, and then stores current date from timer unit 41. The calculator 77 subtracts the data indicating the previous summary date from the current date and time data from the timer unit 41, thereby obtaining elapsed days and hours (i.e., an elapsed period). The data indicating the elapsed period is supplied to the calculator 47 through the buffer 81. On the other hand, in accordance with the first control signal, the gate 59 selects the address data "1" from the address generator 63 and generates it. The storage contents in the location defined by the address "1" on the memory 71 is supplied to the detector 73. The detector 73 detects if the flag is set for the input data. If the flag is set, i.e., if the item of the item number "1" is in the out-of-stock state, the detector 73 generates an H level signal. If no flag is set, the detector 73 generates an L level signal. When the detector 73 generates the H level signal, the gate 75 is opened. When the L level signal is generated, the gate 75 is closed.

In response to the first control signal, the gate 61 selects the address data "1" and generates it. Thus, the storage contents in the locations defined by the address "1" in the memory areas M8 to M10 of the memory 51 are supplied to the calculator 47 through the gate 75. The calculator 47 adds the data indicating the out-of-stock days and hours stored in the memory areas M8 and M9 and the elapsed period data supplied from the buffer 81, thus obtaining new out-of-stock period data (out-of-stock days and out-of-stock hours). The out-of-stock period data is supplied to the gate 49. In response to the first control signal, the gate 49 selects and outputs the out-of-stock period data. The new out-of-stock period data is stored in the location defined by the address "1" in the memory areas M8 and M9. Note that when the output signal from the detector 73 is at the L level, the calculator 47 generates the data "0" and the data "0" is written in the memory areas M8 and M9 in the same manner as described above.

The controller 65 sets the second control signal to the H level. The limit period data stored in the location defined by the address "1" in the memory 43 is supplied to the detector 53. Furthermore, the out-of-stock day data and hour data stored in the memory areas M8 and M9 are supplied to the detector 53. When the out-of-stock period data is equal to or larger than the limit period data, the detector 53 sets a flag in the location defined by the address "1" in the memory area M10.

The controller 65 sets the third control signal to the H level. The gate 55 selects the output data from the generator 63 and supplies the selected data to the memory 23. The storage contents in the locations defined by the address "1" in the memory 23 are supplied to the gate 27. The gate 27 selects the output data from the memory 23 in response to the third control signal, and supplies the selected data to the printer 31, the display 33 and the controller 35. The printer 31 prints an item number, an item name, a sales number, a unit price, sales and the like on journal paper as shown in FIG. 3.

The controller 65 sets the fourth control signal to the H level. The gate 61 selects the output data from the generator 63 and supplies the selected data to the memory 51. The storage contents in the locations defined by the address "1" in the memory 51 are supplied to the gate 27 through the gate 75. The gate 27 selects the output data from the memory 51 in response to the signal S4, and supplies the selected data to the printer 31 and the like through the output buffer 29. The printer 31 prints the out-of-stock days, the out-of-stock hours, a symbol "*" as a signal and the like as shown in FIG. 3.

The controller 65 sets the signal S5 to the H level. The gate 55 selects the address "1" and generates it. The calculator 21 clears the storage content at the address "1" in the memory area M3 in response to the signal S5.

The controller 65 sets the fifth control signal to the L level and supplies the count-up signal CP to the address generator 63. The address generator 63 generates address data "2". The first to fifth control signals sequentially go to the H level, and the above operation for the address "2" is executed. Thereafter, the above operation is repeated up to the address "n". As shown in FIG. 3, the out-of-stock period and the like of items of the item numbers "1" to "n" are printed on the journal paper.

The operation in the stock-in mode will be described hereinafter.

The operator switches the mode switch 17 to the stock-in mode. The controller 65 sets the sixth control signal S6 at the H level in response to the mode data MD corresponding to the stock-in mode. The input data from the keyboard 1 is stored in the buffer 19. In response to the sixth control signal, the gate 55 generates the address data from the buffer 19. The calculator 21 reads out the stock data stored in the memory area M2, and adds the readout stock data to the stock data supplied from the buffer 19. The new stock data is stored in the corresponding location in the memory area M2. The sixth control signal S6 goes to the L level, and the seventh control signal S7 goes to the H level. The corresponding locations in the memories 71 and 51 are designated by the gates 59 and 61. If the new stock data is equal to or larger than the value stored in the memory 37, the detector 25 generates an L level signal, and the corresponding out-of-stock flag (M21), the out-of-stock day data (M8), the out-of-stock hour data (M9) and the limit flag (M10) are cleared. On the other hand, if the new stock data is smaller than the storage content of the memory 37, the detector 25 generates an H level signal, and the storage contents in the memories M21, M8, M9 and M10 are not cleared.

Every time new stock data is input, the above operation is repeated.

The operation in the setting mode of the sales data processing apparatus will be described hereinafter.

In the setting mode of the apparatus, the same operation as that of the first embodiment is performed. The eighth control signal goes to the H level, and the storage content of the memory 37 is set. The ninth control signal goes to the H level and the content of the timer unit 41 is set. The 10th control signal goes to the H level and the content of the memory 43 is set.

In the first and second embodiments, the addresses "1" to "n" are given so as to correspond to the item numbers "1" to "n" of the items. However, the present invention is not limited to this. An address in the memory need not have one-to-one correspondence to item numbers. The number "n" of items can be arbitrarily set.

In the first and second embodiments, the out-of-stock period is printed on the journal paper in the order of item numbers, and the out-of-stock period is obtained in units of days and hours. However, the present invention is not limited to this. The out-of-stock periods can be printed from longer ones. In this case, the apparatus is arranged as shown in FIG. 5. Referring to FIG. 5, the output data from the output buffer 29 is supplied to a converter 81. The converter 81 selects the out-of-stock day data and the out-of-stock hour data from the data from the buffer 29. Then, the out-of-stock days are multiplied by 24 hours so as to be converted into units of hours. The converter 81 adds the calculation result to the out-of-stock hour data. In this manner, the out-of-stock period data in units of hours can be obtained. The out-of-stock period data in units of hours obtained by the converter 81 is supplied to a sorting circuit 83. The sorting circuit 83 temporarily stores the output data from the converter 81. After all the period data is supplied, the storage data are sorted in a predetermined order in accordance with a normal sorting program. For example, the period data are sorted from larger or smaller ones. The sorted data are supplied to the printer 31 and are printed on the journal paper.

In the above embodiments, the data indicating the date and time are supplied from the timer unit 41. However, the present invention is not limited to this. For example, the time data can be consecutively input from the keyboard 1. Alternatively, for example, the controller 35 may be connected to the timer unit 41 so that the date and time data are supplied from an external device (e.g., a host computer).

In the above embodiments, when the operator switches the mode switch 17 to the summary mode, the summary operation is executed. However, the present invention is not limited to this. For example, the summary operation can be automatically performed at constant intervals. In this case, every time a predetermined period of time, e.g., 24 hours has elapsed, the timer unit 41 generates a signal. The signal can be supplied to the controller 65 as a signal Z indicating the summary mode.

The printing method of the journal paper shown in FIG. 3 is an example, and the present invention is not limited to this.

Figure 6:
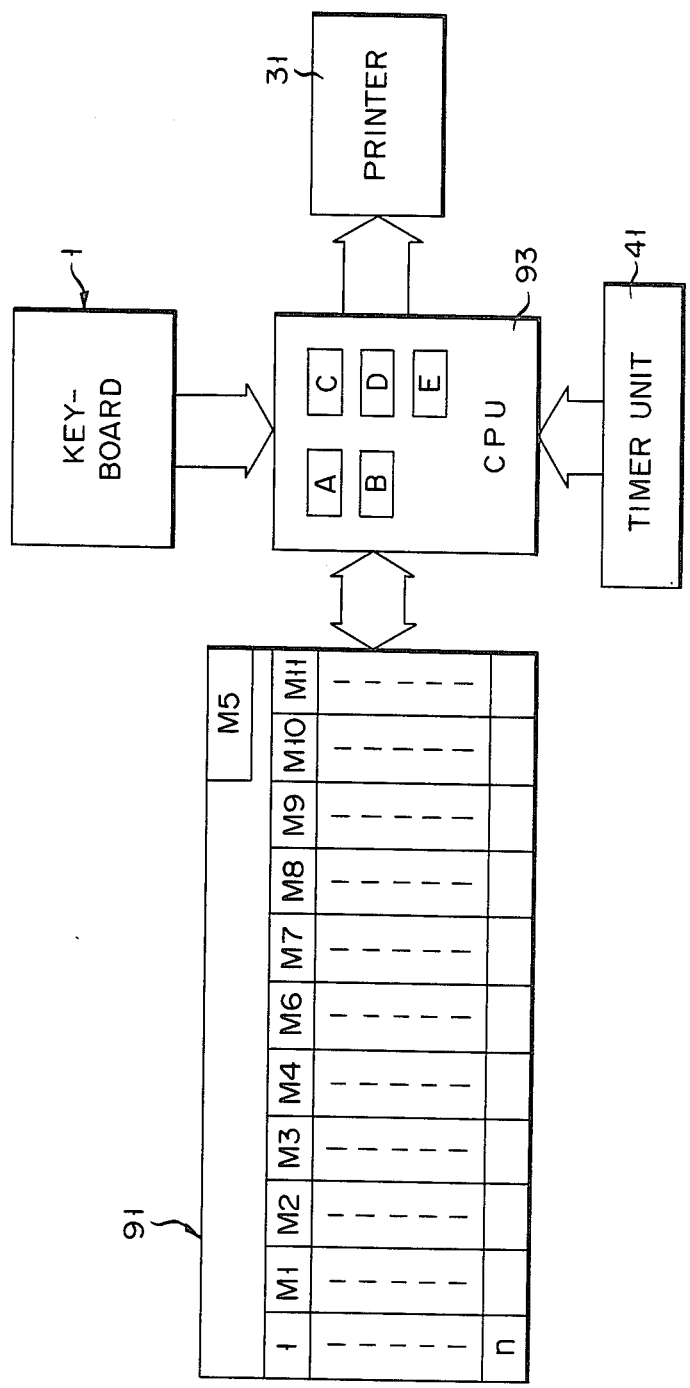
FIG. 6 is a block diagram showing an arrangement of a sales data processing apparatus according to the third and fourth embodiments of the present invention.

A third embodiment of the present invention will be described hereinafter. In this embodiment, the sales data processing apparatus according to the first embodiment of the present invention is arranged by using a single CPU. FIG. 6 shows a basic arrangement of the sales data processing apparatus of this embodiment. Note that the same reference numerals as in FIGS. 1A and 1B denote the same parts in FIG. 6 and a detailed description thereof is omitted.

In this embodiment a single memory 91, having memory areas M1 to M11, is used. A CPU 93 has an A register, a B register, a C register, a D register, an E register and the like.

Figure 8:
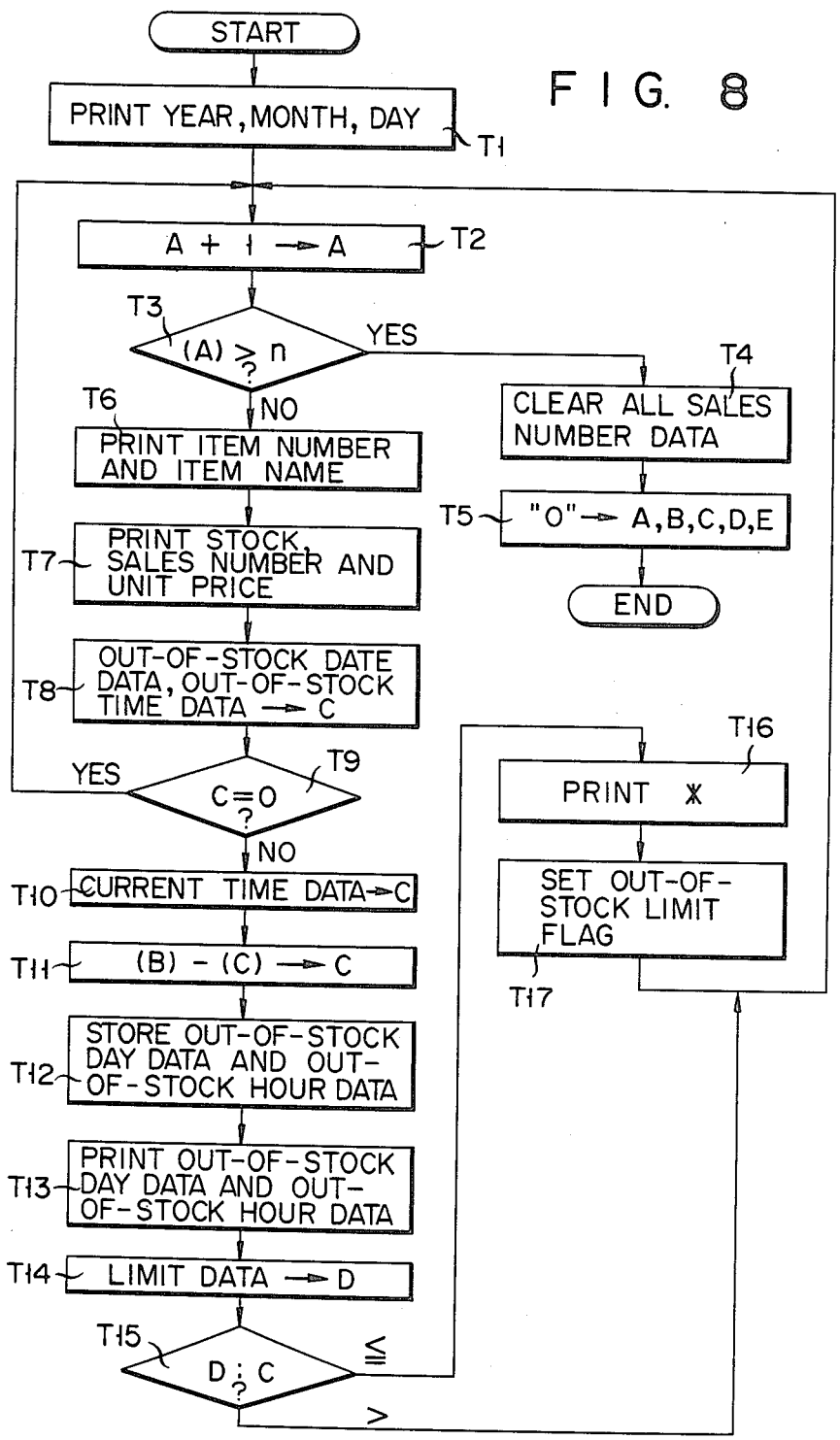
FIG. 8 is a flow chart for explaining an operation in a summary mode of the sales data processing apparatus according to the third and fourth embodiments of the present invention.
Figure 9:
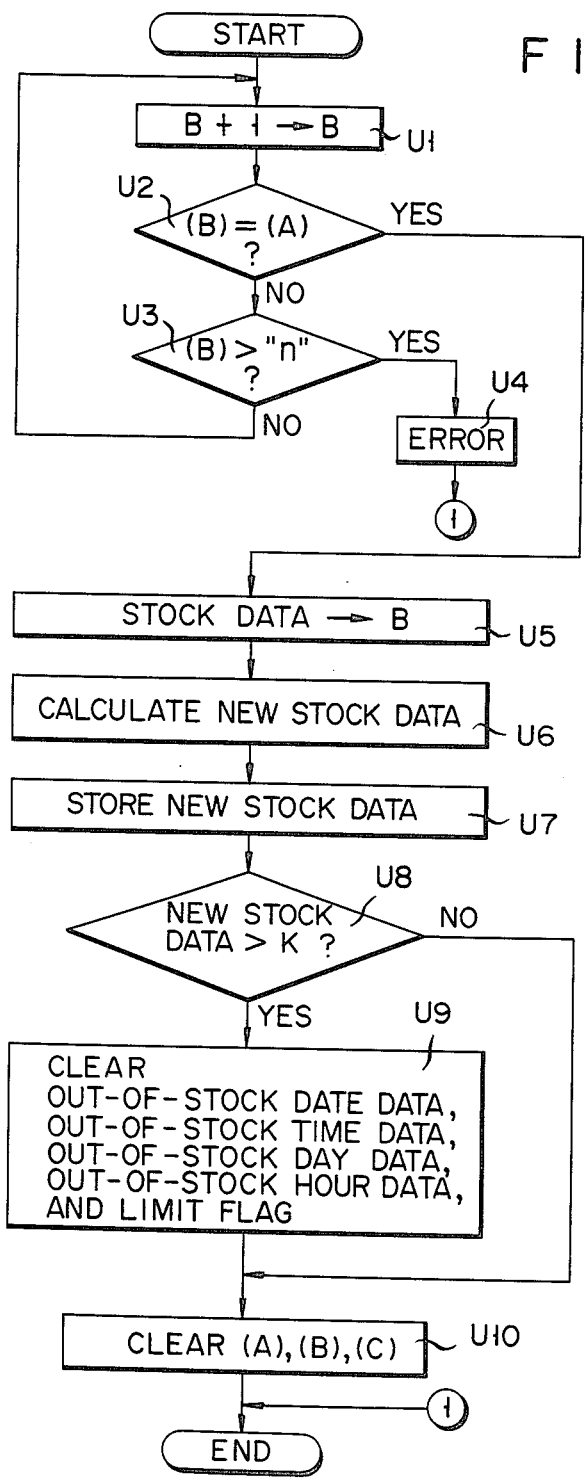
FIG. 9 is a flow chart for explaining an operation in a stock-in mode of the sales data processing apparatus according to the third and fourth embodiments of the present invention.

The operation of the sales data processing apparatus with the above arrangement will be described with reference to flow charts shown in FIGS. 7 to 9.

First, the operation in the registration mode of the apparatus according to the third embodiment of the present invention will be described. Assume that when a stock of a certain item becomes a preset number "k" (e.g., "0") or less, the item is regarded to be in the out-of-stock state. For the sake of simplicity, the printing operation in the registration mode is omitted. In the same manner as in the first embodiment, assume that "p" items of an item number "m" are registered.

When an operator inputs an item number of a certain item using a keyboard 1, the item number is set in the A register. The sales number of the item is set in the D register. Every time sales of the item are registered, the flow chart shown in FIG. 7 is executed.

In step S1, the content of the B register which is in a cleared state is incremented by one. An item number "1" is set in the B register. In step S2, the CPU checks if the item number "1" coincides with an item number stored in the A register. If YES in step S2, the control flow advances to step S5. If NO in step S2, the control flow advances to step S3. It is checked in step S3 if the item number is erroneously input (i.e., if the content of the B register is larger than the maximum item number "n"). If YES in step S3, the control flow advances to step S4 and error processing is performed, thus ending the registration mode. If NO in step S3, the control flow returns to step S1. If the input item number "m" is detected in step S2, the control flow advances to step S5.

In step S5, date data and time data stored at the address "m" in the memory areas M6 and M7 are transferred to the C register. It is checked in step S6 if the data in the C register is "0". If NO in step S6, since the item is in the out-of-stock state, it is determined that the item number is erroneously input, and the control flow advances to step S8. In step S8, predetermined error processing is performed. However, if YES in step S6, the control flow advances to step S7. In step S7, stock data stored at the address "m" on the memory area M2 of the memory 91 is transferred to the C register. In step S9, the content of the D register is subtracted from that of the C register. That is, since the "p" items were sold, the new stock data is to be obtained. In step S10, the new stock data is stored at the address "m" in the memory area M2.

It is checked in step S11 if the new stock data stored in the C register is "k" or less. If NO in step S11, the control flow jumps to step S14. However, if YES in step S11, the control flow advances to step S12. In step S12, current time data is transferred from a timer unit 41 to the C register. In step S13, the content of the C register is stored in the locations defined by the address "m" in the memory areas M6 and M7. In other words, the date and time when the item of the item number "m" was in the out-of-stock state are stored in the memory areas M6 and M7. In step S14, the data in the location defined by the address "m" in the memory area M3 is transferred to the C register. That is, the sales number data is transferred to the C register. In step S15, the content "p" of the D register is added to the content of the C register, thereby obtaining new sales number data. In step S16, the new sales number data is stored in the location defined by the address "m" in the memory area M3.

In step S17, unit price data of the item of the item number "m" is transferred from the memory area M4 to the C register. In step S18, the unit price data is multiplied with the sales number "p" stored in the D register, thus obtaining sales data. In step S19, subtotal data in the memory area M5 is transferred to the B register. In step S20, the sales data stored in the C register is added to the content of the B register, thus obtaining new subtotal data. In step S21, the content of the B register is stored in the memory area M5. In other words, the new subtotal data is stored in the memory area M5. In step S22, the contents of the A, B and C registers are cleared, thus ending one registration operation.

The operation in the summary mode of the sales data processing apparatus according to the third embodiment of the present invention will be described with reference to FIG. 8.

In step T1, a summary date (year, month and day) is printed on the journal paper. In step T2, the content of the A register which is cleared in advance is incremented by one. In step T3, it is checked if the content of the A register exceeds the maximum item number "n". If YES in step T3, the control flow advances to step T4. In step T4, all the sales number data stored in the memory area M3 are cleared. In step T5, the contents of the A, B, C, D and E registers are cleared, thus ending the control flow. However, if NO in step T3, the control flow advances to step T6.

In step T6, an item number ("01" herein) and an item name thereof stored in the A register are printed on the journal paper, as shown in FIG. 3. The stock data stored in the location defined by the address "1" in the memory area M2 corresponding to the item number "01" is printed. Thereafter, the sales number stored at the address "1" in the memory area M3 is printed. Then, the unit price data stored at the address "1" in the memory area M4 is printed. In step T8, the out-of-stock date data and out-of-stock time data at the address "1" in the memory areas M6 and M7 are transferred to the C register. It is checked in step T9 if the content of the C register is "0", i.e., if the item of the item number "1" is not in the out-of-stock state. If YES in step T9, the control flow returns to step T2. However, if NO in step T9, i.e., if the content of the C register is not "0" (the item is in the out-of-stock state), the control flow advances to step T10. In step T10, current date and time data are transferred from the timer unit 41 to the B register.

In step T11, the content of the C register is subtracted from the content of the B register, and the calculation result is held in the C register. In other words, the number of days and hours when the item was in the out-of-stock state is obtained. In step T12, the content of the C register is divided into day data and hour data and respective data are stored at the address "1" in the memory areas M8 and M9. In step T13, the content of the C register (out-of-stock days and hours) is printed. Then, in step T14, the limit data stored at the address "1" in the memory area M11 is transferred to the D register. It is checked in step T15 if the content of the C register is equal to or larger than the content of the D register, i.e., if the out-of-stock state exceeds the limit period. If the content of the C register is equal to or larger than the content of the D register, the control flow advances to step T16 and a symbol "*" is printed as a signal. Then, the control flow returns to step T2. However, if the content of the C register is smaller than the content of the D register, the control flow returns to step T2. The same operation is repeated for the items with numbers "02", "03" to "n".

Finally, in step T2, it is determined that the content of the A register exceeds the maximum number "n", and the control flow ends.

The operation in the stock-in mode of the sales data processing apparatus will be described with reference to FIG. 9.

The item number input by the key operation is set in the A register, and the number of stocked-in items is set in the C register. In this embodiment, assume that "r" items of an item number "q" are put into stock in the same manner as in the first embodiment.

In steps U1 to U3, the input item number of the item is obtained.

In step U5, the stock number stored at the address "q" in the memory area M2 is transferred to the B register. In step U6, the stock data "r" set in the C register is added to the immediately preceding stock data stored in the B register, thereby obtaining new stock data. In step U7, the new stock data stored in the B register is stored at the address "q" in the memory area M2. It is checked in step U8 if the new stock data is larger than "k". If YES in step U8, since the item is not in the out-of-stock state, the control flow advances to step U9. In step U9, the contents at the address "q" in the memory areas M6, M7, M8, M9 and M10 are cleared. Then, the control flow advances to step U10, and the contents of the A, B and C registers are cleared. However, if NO in step U8, the control flow advances to step U10.

Figure 1B:
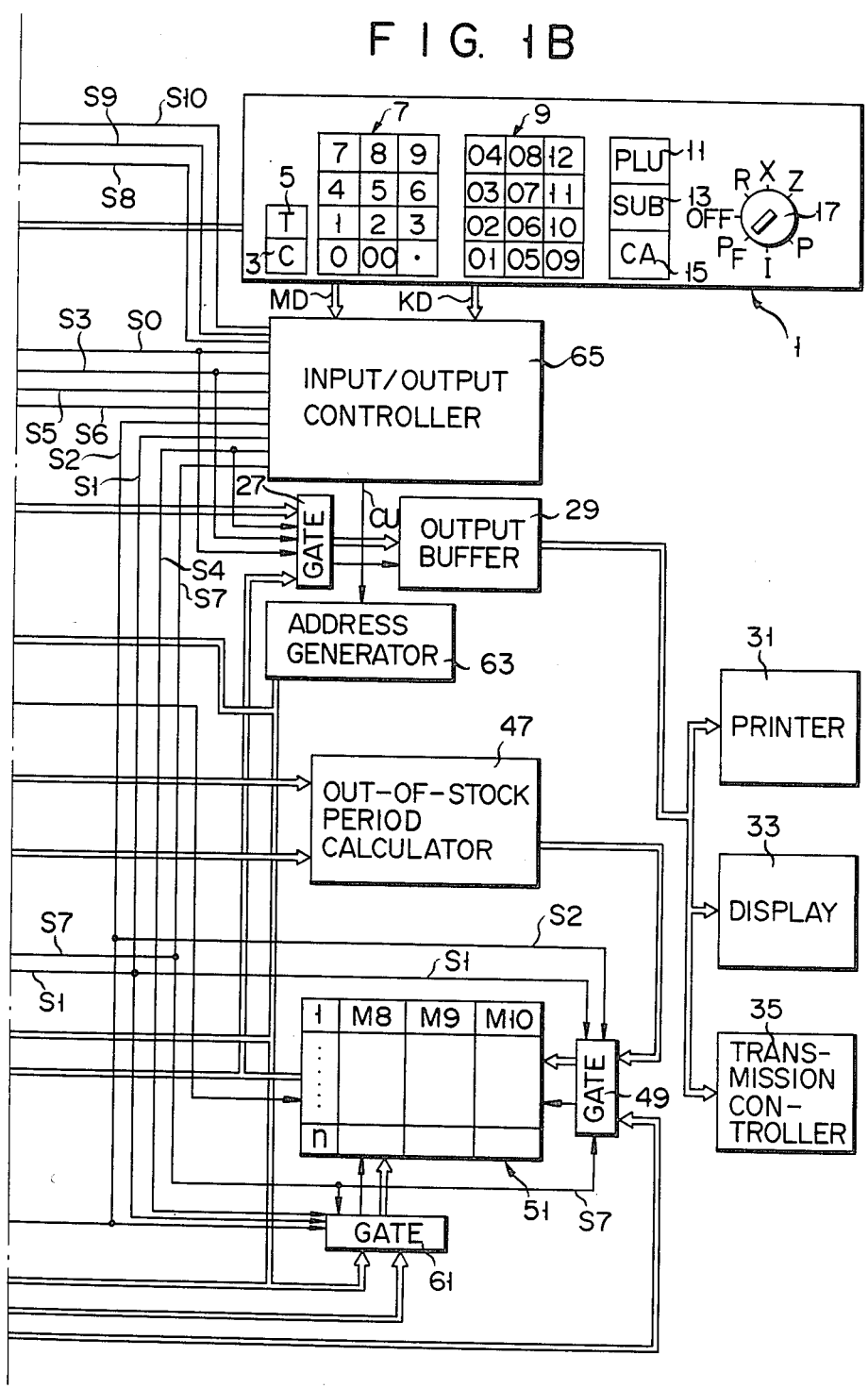

In this manner, the sales data processing apparatus shown in FIGS. 1A and 1B can be arranged using a single CPU.

The sales data processing apparatus according to the second embodiment of the present invention can be arranged using a single CPU. In this case, a memory area M21 is added to the memory 91 shown in FIG. 6. Also, a summary date memory 79 is added.

The operation of a sales data processing apparatus according to a fourth embodiment of the present invention will be described hereinafter. The operation of the apparatus of the fourth embodiment is substantially the same as that shown in the flow charts of FIGS. 7 to 9. Therefore, an operation different from that shown in the flow charts will mainly be described.

The operation in the registration mode of the sales data processing apparatus according to the fourth embodiment will be described with reference to FIG. 7.

In this case, if it is determined that the item is in the out-of-stock state in steps S12 and S13 of the flow chart shown in FIG. 7, a flag is set at the address "m" in the memory area M21.

The operation in the summary mode of the sales data processing apparatus will be described with reference to FIG. 8.

In this embodiment, it is checked in step T9 if the out-of-stock flag is set in the memory area M21. In steps T10 and T11, the elapsed period from when the previous summary operation was performed is obtained. The obtained elapsed period is added to the out-of-stock day data and the out-of-stock hour data of the previous summary stored in the memory areas M8 and M9, thus obtaining a new out-of-stock period. The date and time of this summary are stored in the memory 79. Thereafter, the control flow advances to step T12.

The operation in the stock-in mode of the sales data processing apparatus according to the fourth embodiment will be described.

In this case, if it is determined that the corresponding item is not in the out-of-stock state in step U8, the out-of-stock flag set in the memory area M21, the out-of-stock days, the out-of-stock hours and the out-of-stock limit flag stored in the memory areas M8 to M10 are cleared.

The flow charts in the above embodiment are not limited to those, and various modifications may be made.

What is claimed is:

1. A sales data processing apparatus, comprising:
   input means for inputting data relating to pieces of items as sold;
   stock data storing means for storing stock data representing a number of stocked pieces of each item;
   subtracting means for receiving data representing a number of sold pieces of each item input from said input means and the stock data of each input item from said stock data storing means, for subtracting the number of sold pieces of each input item from the number of stocked pieces of the item, and for providing and supplying new stock data corresponding to the number of stocked pieces of each input item to said stock data storing means;
   stock data detecting means for receiving the new stock data provided by said subtracting means, and for generating an out-of-stock signal upon detecting that the number of stocked pieces has reached a preset number for each input item;
   detected time storing means for receiving the out-of-stock signal from said detecting means, and for storing detected time data representing at least one of date and time when the number of stocked pieces reaches said preset number;
   current time storing means for storing current time data representing at least one of current date and current time;
   calculating means for receiving the time data stored by said detected time storing means, and the current time data stored by said current time storing means, for subtracting the detected time data from said current time data, and for providing period data representing a period between the time that the number of stocked pieces reaches said preset number and the current time data; and
   calculation designating means coupled to said calculating means, for requesting a calculation of the period data by said calculating means.

2. An apparatus according to claim 1, wherein
   said detected time storing means and said current time storing means respectively store the detected time data and the current time data in units of data and clock time, and said calculating means calculates the period data in units of days and hours;
and further comprising timer means and converting means, said timer means supplying the current time data to said current time storing means and said current time storing means storing the output of said timer means, and said converting means receiving the period data from said calculating means and converting the period data into units of hours.

3. An apparatus according to claim 1, wherein said calculation designating means includes switching means for requesting said calculation of the period data, and for requesting an output of the calculated period data.

4. An apparatus according to claim 1, further comprising updating means, coupled to said calculating means, for detecting a lapse of a predetermined period of time and for requesting a calculation of the period data for each lapse of said predetermined period of time.

5. An apparatus according to claim 1, further comprising:
limit data storing means for storing a predetermined period;
limit period detecting means for receiving said predetermined period from said limit data storing means and the period data from said calculating means, and for detecting if the period data is equal to or longer than the predetermined period; and
printing means for printing in a format which shows detection results of said limit period detecting means.

6. An apparatus according to claim 1, further comprising:
means for inputting stock-in data representing a number of newly stocked pieces of each item;
base stock data calculating means for receiving the stored stock data for each item from said stock data storing means, and the stock-in data from said stock-in data inputting means, and for calculating base stock data by adding the stock-in data and the stock data, said stock data storing means then storing the base stock data as said stock data; and
control means for receiving the base stock data from said base stock data calculating means, and for erasing the period data corresponding to the base stock data, when the base stock data is stored in the stock data storing means.

7. A sales data processing apparatus, comprising:
input means for inputting data relating to pieces of items as sold;
stock data storing means for storing stock data representing a number of stocked pieces of each item;
subtracting means for receiving data representing a number of sold pieces of each item input and the stock data from said stock data storing means, for subtracting the number of sold pieces of each input item from the number of stocked pieces of the item, and for providing and supplying new stock data corresponding to the number of stocked pieces of the item to said stock data storing means;
stock data detecting means for receiving the new stock data provided by said subtracting means, and for generating an out-of-stock signal upon detecting that the number of stocked pieces has reached a preset number;
flag storing means having a plurality of memory areas for receiving the out-of-stock signal from said detecting means, and for setting a flag in a memory area associated with the item, when said stock data detecting means detects that the number of stocked pieces of the item reaches said preset number;
current time storing means for storing current time data representing at least one of current date and current time;
calculation designating means for generating a signal requesting calculation of a period between the time that the number of stock pieces has reached said preset number and the current time;
calculation request time storing means for receiving the signal from said calculation designating means, and for storing calculation request time data representing at least one of date and time when said calculation designating means requests the calculation of said period;
period data storing means for storing period data in association with each flag which set in said flag storing means, the period data representing said period;
calculating means for receiving the calculation request time data from said calculation request time storing means and said current time storing means, for calculating the difference between the calculation request time data and the current time data, and adding said difference to the period data stored in said period data storing means for providing period data representing the period between the time that the number of stock pieces reaches said preset number and the current time; and
calculation designating means coupled to said calculating means, for requesting a calculation of the period data by said calculating means.

8. An apparatus according to claim 7, wherein
said calculation request time storing means and said current time storing means respectively store the calculation request time data and the current time data in units of data and clock time, and said calculating means calculates the period data in units of days and hours;
and further comprising timer means and converting means, said timer means supplying the current time data to said current time storing means and said current time storing means storing the output of said timer means, and said converting means receiving the period data from said calculating means and converting the period data into units of hours.

9. An apparatus according to claim 7, wherein said calculation designating means includes switching means for requesting said calculation of the period data, and for requesting an output of the calculated period data.

10. An apparatus according to claim 7, further comprising updating means, coupled to said calculating means, for detecting a lapse of a predetermined period of time and for requesting a calculation of the period data for each lapse of said predetermined period of time.

11. An apparatus according to claim 7, further comprising:
limit data storing means for storing a predetermined period;
limit period detecting means for receiving said predetermined period from said limit data storing means and the period data from said calculating means, and for detecting if the period is equal to or longer than the predetermined period; and printing means for printing in a format which shows detection results of said limit period detecting means.

12. An apparatus according to claim 7, further comprising:

means for inputting stock-in data representing a number of newly stocked pieces of each item;

base stock data calculating means for receiving the stored stock data for each item from said stock data storing means, and the stock-in data from said stock-in data inputting means, and for calculating base stock data by adding the stock-in data and the stock data, said stock data storing means then storing the base stock data as said stock data; and control means for receiving the base stock data from said base stock data calculating means, and for erasing the period data corresponding to the base stock data, when the base stock data is stored in the stock data storing means.

* * * * *